June 17, 1930.   C. P. BROCKWAY ET AL   1,764,386
SLEEVE VALVE GAS ENGINE
Original Filed June 18, 1921    3 Sheets-Sheet 1
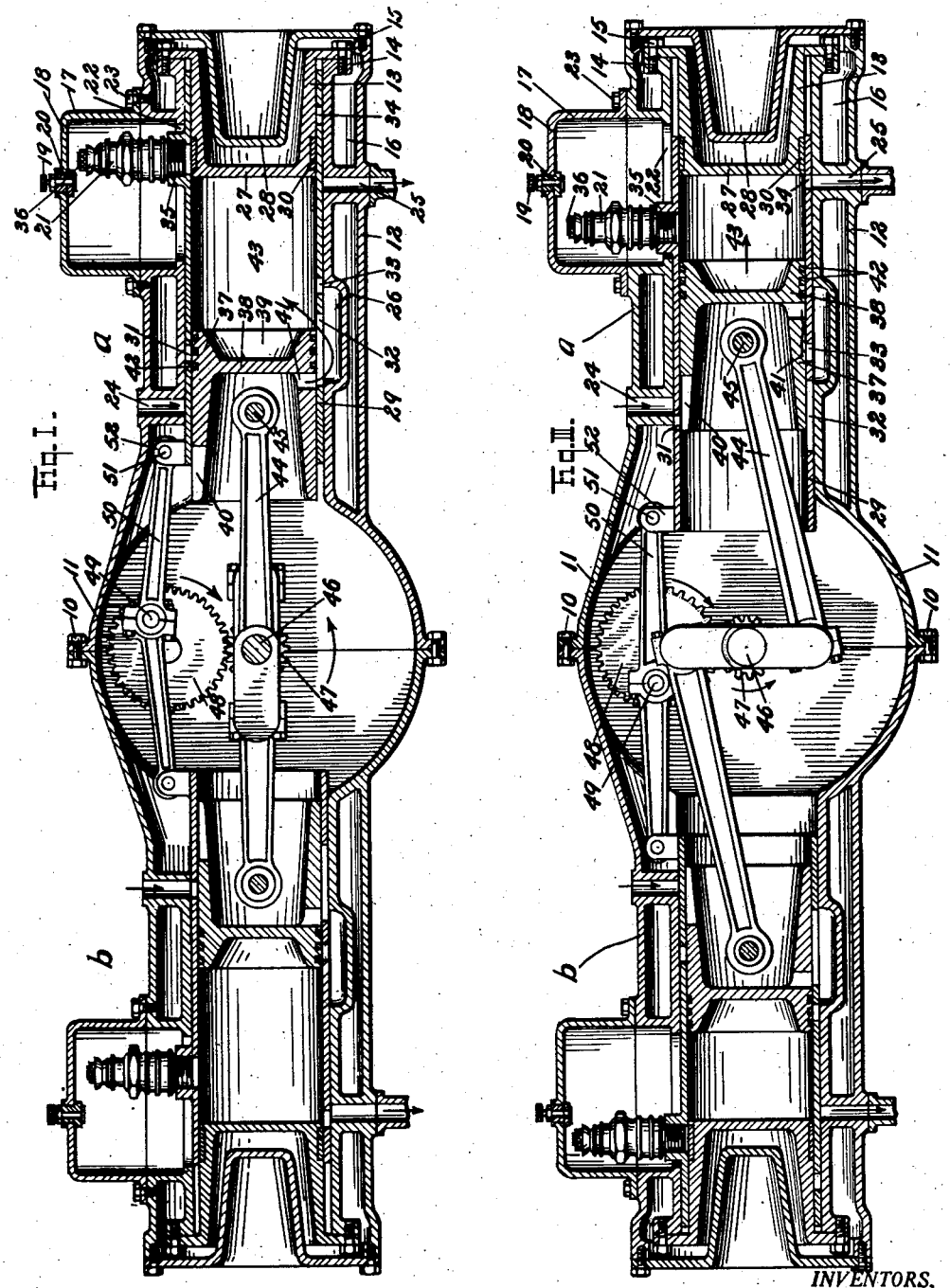
INVENTORS.
Carl P. Brockway
Don D. Myers
BY
ATTORNEY

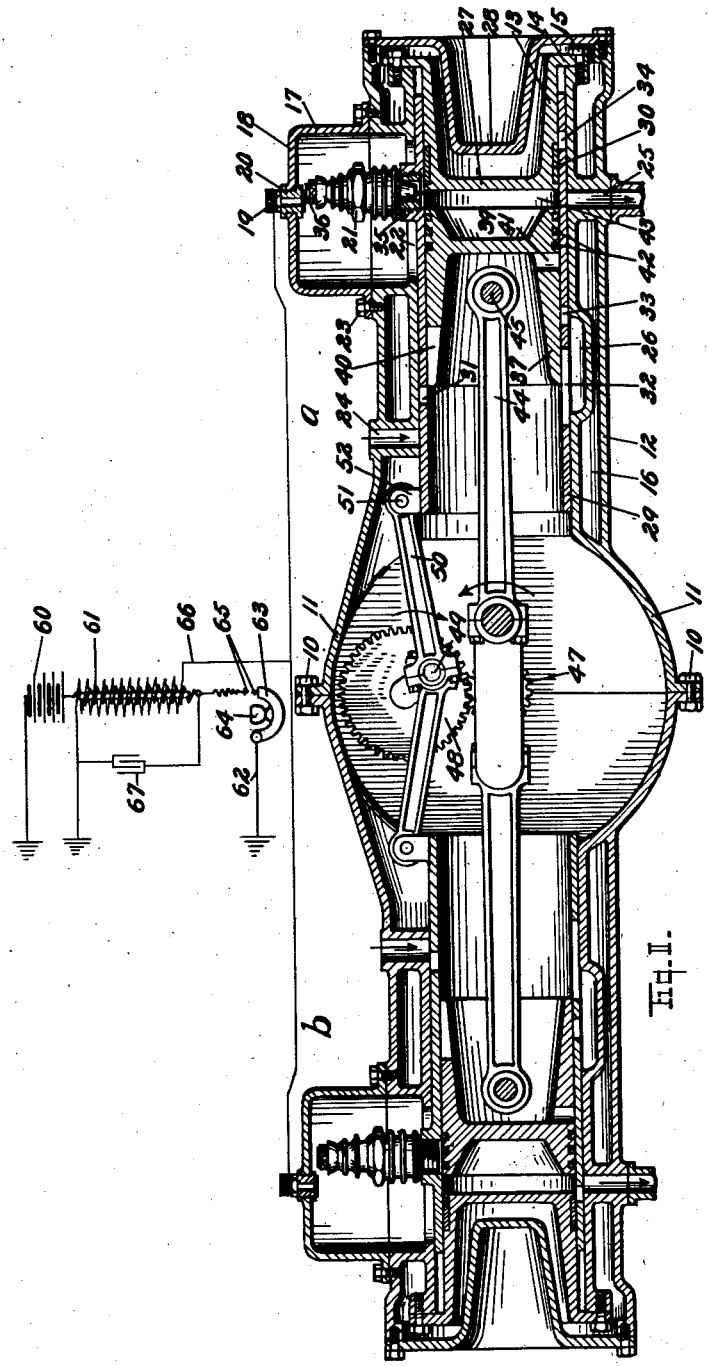

June 17, 1930.                C. P. BROCKWAY ET AL                1,764,386
                                SLEEVE VALVE GAS ENGINE
                        Original Filed June 18, 1921    3 Sheets-Sheet 3
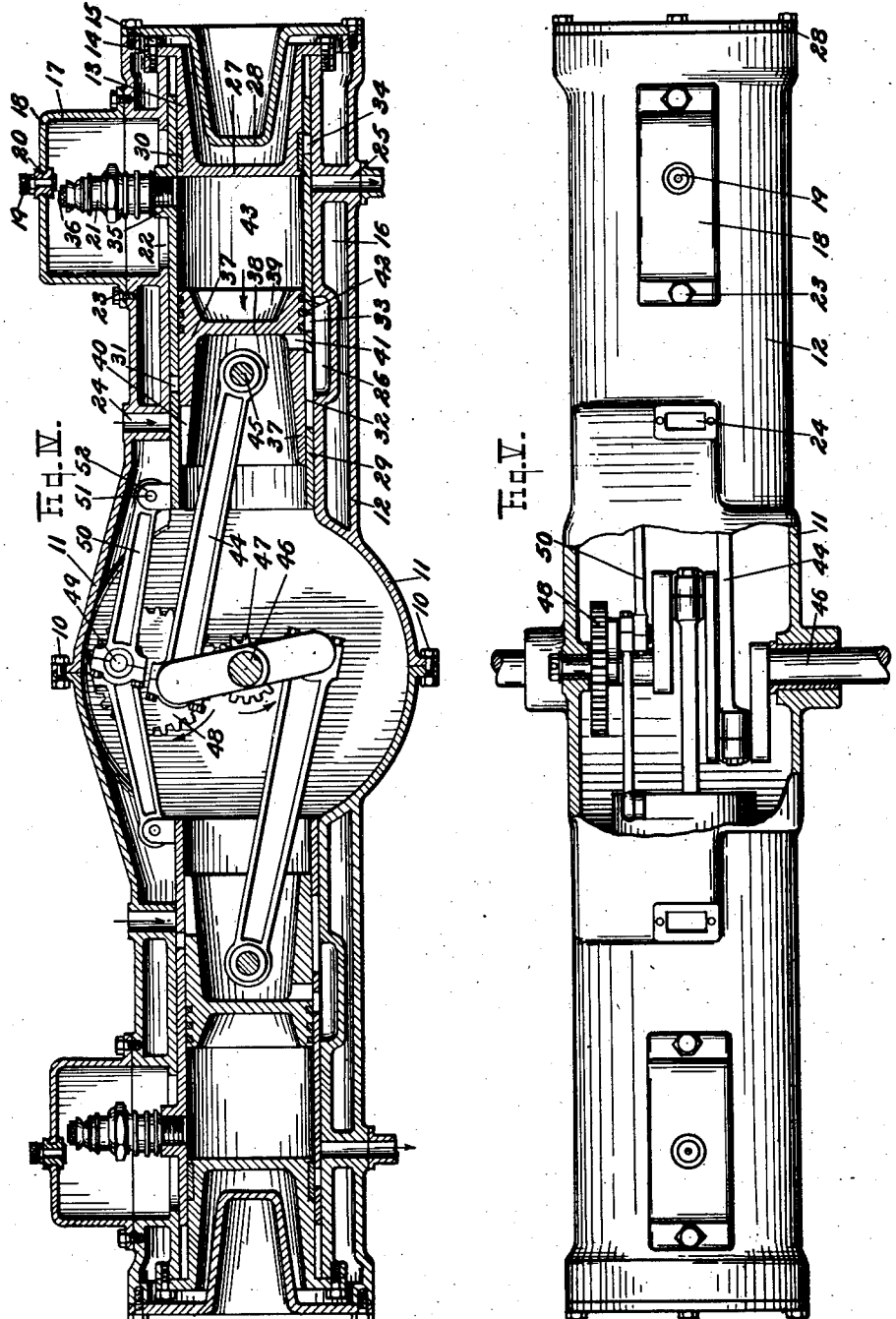
INVENTORS.
Carl P. Brockway
Don D. Myers
BY
Chester H. Braselton
ATTORNEY Patented June 17, 1930

1,764,386

UNITED STATES PATENT OFFICE

CARL P. BROCKWAY, OF PATERSON, NEW JERSEY, AND DON D. MYERS, OF TOLEDO, OHIO, ASSIGNORS TO INDUSTRIAL RESEARCH CORPORATION, OF TOLEDO, OHIO, A CORPORATION OF DELAWARE

SLEEVE-VALVE GAS ENGINE

Application filed June 18, 1921, Serial No. 478,475. Renewed March 11, 1929.

This invention relates to internal combustion engines of the sleeve valve type and contemplates improvements on the construction and operation thereof.

An important object considered is the utilization of ignition means in a multi-cylindered engine of the above type which will obviate the employment of the current distributor heretofore considered necessary.

An object of the invention is also embodied in means for forming a two gap circuit in the secondary ignition connection to each cylinder thereby effecting a maximum surety of spark formation.

A further object of the invention is the provision of single means for supplying a multi-cylindered internal combustion engine with fuel gas under pressure thereby reducing the time requisite for fuel charging and permitting greater speed of operation.

Further objects are contemplated in the employment of a single sleeve valve structure in connection with means previously suggested, with attendant advantages appearing in greatly improved cooling and efficacious valve action; in the utilization of a simplified structure; and in other advantageous arrangements which will appear in consideration of the drawings and detailed subsequent description.

In the drawings wherein like numerals refer to like parts,

Figure I is a longitudinal section through a double unit opposing cylinder internal combustion engine, the cylinder (a) being in charging position and the cylinder (b) being in the beginning of its exhaust stroke.

Figure II is a similar section in which piston (a) is in firing position and piston (b) at end of exhaust stroke. This figure shows also the ignition wiring.

Figure III is a similar section in which the piston cylinder (a) is moving in the exhaust stroke and the piston of cylinder (b) is compressing the charge.

Figure IV is a longitudinal section in which piston (a) is moving in the suction stroke and piston (b) is moving in the power stroke; and Figure V is a plan view of the engine, partly sectioned to show the crank-shaft and valve gearing.

In the drawings is illustrated a specific embodiment of my invention as applied to a two-cylindered opposed type internal combustion engine having 4 cycles though it should be understood that distinctive features of the invention may be utilized in conjunction with engines having any suitable number of cylinders, and that the engine may be of the opposed, parallel or rotary type.

Referring to Figure I there is illustrated two opposing engines (a) and (b) suitably secured at their bases to each other as by bolts 10. Confining the description to engine (a) which is identical to engine (b) in its broad features, there is shown a crank case part 11, a cylinder 12, and a cylinder head 13, the crank case part and cylinder being formed integral and the cylinder head being attached to the flanged end surface 14 of the cylinder by means of screws 15.

For cooling the engine the cylinder walls are formed hollow as at 16 to provide for the circulation of a cooling liquid but the invention is not limited to this mode of cooling as air cooling may also be advantageously employed.

On one side of this cylinder a box like casing 17 is formed in the outer wall 18 of which a screw clamping ignition terminal 19 is fixed. A plug 20 of insulating material prevents discharge of current from the terminal to the engine. The casing 17 is fixed to the engine cylinder over an opening 22 in the cylinder wall by means of screws 23; and the terminal connector 19 therein is adapted to make electric connection with the spark plug 21 in a manner herein-after fully described.

Formed in the cylinder wall is inlet port 24 adapted to make connection to the crank case interior, and outlet or exhaust port 25. A portion of the cylinder wall, also, is depressed to form a conduit 26 which, as will hereinafter be described, permits the fuel gases to pass into the combustion chamber of the cylinder from the crank case.

Mention has been previously made of the hollow formation of the cylinder wall for cooling purposes. Annularly, the cylinder head 13 is divided into inner and outer parts 27 and 28 the hollow interior formed in between the parts having communication with the hollowed portions of the cylinder walls, thus including the cylinder head in the cooling area. The two parts 27 and 28 of the cylinder head may be formed integral with each other or separate as shown, the inner part 27 being fixed to the inner cylinder wall and the outer part 28 being fixed to the outer cylinder wall.

The cylinder head is cupshaped in formation the body of the cup extending within the cylinder and spaced therefrom to form a restricted bearing for the end of the valve sleeve 29; and a junk ring 30 around the cupped head adjacent its inner extremity is provided for preventing undue escape of gases from the cylinder.

The valve system provided is embodied in a single sleeve 29 adapted to have sliding contact on the inner wall of the cylinder. Suitable ports 31, 32, 33 and 34 are cut in the sleeve walls, these ports being more or less circumferential in extent so as to permit large area of opening combined with short axial depth. The port 31 controls the inlet port 24 to the crank case, the ports 32 and 33 control the cylinder intake conduit 26, and the port 34 controls the exhaust opening 25.

Affixed to the sleeve wall at 35 and having access to the cylinder interior therethrough is a spark plug 21 hereinbefore referred to, the stem of which extends into and is adapted to have sliding movement within the casing 17. The outer end 36 of the spark plug is flattened and is adapted to have movement in close proximity but out of contact with the ignition terminal 19 so that, during the reciprocation of the sleeve a high tension current may pass from terminal 19 to the end 36 of the spark plug, when the spark plug is passing adjacent thereto. This is an important feature of the invention as will be fully brought out below.

The piston employed in our invention is shown as an integral casting 37 the head 38 of which is dished outwardly as at 39 and the skirt of which is apertured as at 40 and 41 to form cooperating parts for the valving function as will be hereinafter detailed. Piston rings 42 combine to prevent undue leakage of gases from explosion chamber 43.

Reciprocation of the piston 37 is by means of the piston rod 44, which at one end has pivotal connection with the wrist or piston pin 45 secured to the piston and at the other end has pivotal connection with the engine crank shaft 46.

Reciprocation of the sleeve is secured through a two to one gear reduction by means of crank shaft gear 47, gear 48, gear pin 49, sleeve rod 50, sleeve pivot 51 and sleeve pivot lug 52. In the double engine unit as shown the sleeve rods are connected to the single gear pin 49 and accordingly alternate in movement within the respective cylinders.

The piston rods on the contrary are pivotally mounted on opposite offset crank shaft portions thus securing movement of the pistons constantly in opposition to each other.

The ignition system employed includes a battery 60; a high tension ignition coil 61; a primary circuit 62; a breaker arm 63; a cam 64; contact points 65; and secondary circuit 66 connected to the high tension ignition terminals 19 on the engine spark plug casings 17. A condenser 67 is shown in shunt about the ignition coils though in some cases it is preferable to shunt the condenser about the contacts 65. The circuits as illustrated are grounded but it is within the scope of our invention to employ complete metal circuits.

In the operation of the engine unit the various position of the valve settings are illustrated in Figures I to IV. Starting with the firing position as indicated in Figure II the piston is at its extreme outer limit with the various ports closed and the spark plug in electric connection with the terminal 19. In this position the inlet sleeve port 31 is advanced beyond the inlet cylinder port 24 and the sleeve exhaust port 34 is beyond the cylinder exhaust port 25.

The sleeve has begun its inner movement and during the power stroke indicated for the opposite cylinder in Figure IV$^b$, and in the beginning of the exhaust stroke indicated in Figure I$^b$, the cylinder and sleeve exhaust ports register and the cylinder intake port moves inwardly beyond the cylinder intake port 24.

During the exhaust stroke indicated in Figure III$^a$, the intake ports are in registry and the outer movement of the piston with its accompanying suction effect draws in fresh gases to the crank case. The end of the exhaust stroke indicated in Figure II$^b$, shows the exhaust and intake ports about to close through outward movement of the sleeve, and the spark plug approaching the contact 19.

The subsequent instroke of the piston shown at Figure I$^a$, first compresses the crank case gases and then uncovers the by-pass ports 32 and 33 whereupon the compressed crank case gas flows rapidly into the cylinder compression space 43. During the first part of this instroke the spark plug passes the contact 19 and a spark passes at the plug terminals; but since no explosive gases exist in this cylinder no effect is produced.

After the cylinder is filled with fresh gases, the subsequent outstroke of the piston as at Figure III$^b$, closes all ports, compresses the gas, and the in-moving sleeve carries the spark plug again into registry; whereupon the charge is ignited and the cycle is once more repeated.

It should be pointed out that as the piston rods of the dual cylinders shown are connected to opposite extremes of the crank arms, and since the suctions and compression states in the various engines alternate, the compression and suction effects in the crank case is multiplied by the simultaneous action of both pistons so that a greatly intensified and very positive feeding of gases into the explosion chambers result, occurring in a comparatively limited period of time. It should be noted further that the piston port 32 is so positioned relative to the piston head that the fresh gases derive full advantage from the heating effect thereof thus properly conditioning them for ignition.

The movement of the interrupter 63 causes sparks to pass whenever the pistons are at their outer limits, but as previously stated the spark is effective in one cylinder only at a time. The high tension spark circuit contains two sparks at the time of breaking of the interrupter contacts, one at the plug terminals and the other between the plug cap 36 and contact 19. This is advantageous for the reason that the sparks do not pass until voltage sufficient to break down both air gaps is induced and when the spark finally passes it appears to have more efficacious ignition characteristics than would otherwise appear.

The embodiment of our invention herein disclosed is of course subject to variation without departing from the spirit of the invention and we therefore desire to claim the same broadly as well as specifically as indicated by the appended claims.

We desire to claim for Letters Patent:—

1. In a multi-cylindered gas engine having axially aligned explosion chambers; a single compression chamber; and means for alternately feeding compressed fuel mixtures from the compression chamber to each of said explosion chambers.

2. In a multi-cylindered gas engine having an explosion chamber in each of a plurality of axially aligned cylinders, the combination of a single combination suction and compression chamber for fuel mixtures; and means in each cylinder for alternately increasing and decreasing the pressure in said suction and compression chamber.

3. In a four cycle internal combustion engine having a crank case and a plurality of axially aligned explosion chambers; conduits connecting the expolsion chambers to the crank case; reciprocable sleeve valves for said conduits; and means operated by the engine crank shaft for operating the valves.

4. In a gas engine having an enclosed crank case having a crankshaft therein, the combination of a cylinder having an axial passageway in its wall; a reciprocable sleeve movable within the cylinder operated by said crankshaft, said sleeve forming an explosion chamber; and a piston having an opening adapted to communicate between the crank case and cylinder passageway; said sleeve by its motion being adapted to alternately establish and dis-establish communication from the crank case to the explosion chamber through the piston port and cylinder passageway.

5. In a gas engine having a crank case and explosion chamber, the combination of a piston movable between said chamber and crank case and having a port in its wall adjacent its head; a conduit adapted to form a passageway between the chamber and piston port; and means including a sleeve adapted to be reciprocated by the engine for opening and closing said passageway, and an exhaust port adjacent the upper end of the explosion chamber.

6. In a gas engine having an enclosed crankcase and a plurality of cylinders; a plurality of pistons reciprocable in said cylinders in opposing directions; a plurality of reciprocable valve sleeves cooperating with said pistons, said valve sleeves being adapted for movement in the same direction.

7. In a gas engine, the combination of a cylinder having an explosion chamber and a mixture inlet passage in its wall; a piston in said cylinder; a reciprocable sleeve valve surrounding said piston, said sleeve and piston having openings for periodically establishing communication between the crankcase and the cylinder; an exhaust port adjacent the upper end of said cylinder, said mixture inlet passage being so arranged that incoming fuel mixtures completely scavenge exhaust gases from the cylinder.

In testimony whereof, we affix our signatures.

CARL P. BROCKWAY.
DON D. MYERS.